United States Patent [19]

Joy et al.

[11] Patent Number: 5,701,470
[45] Date of Patent: Dec. 23, 1997

[54] SYSTEM AND METHOD FOR SPACE EFFICIENT OBJECT LOCKING USING A DATA SUBARRAY AND POINTERS

[75] Inventors: William N. Joy, Aspen, Colo.; Arthur A. van Hoff, Mountain View, Calif.

[73] Assignee: Sun Microsystems, Inc., Mountain View, Calif.

[21] Appl. No.: 569,753

[22] Filed: Dec. 8, 1995

[51] Int. Cl.$^6$ .................................................. G06F 17/30
[52] U.S. Cl. ........................ 395/614; 395/619; 395/612; 395/614
[58] Field of Search ........................ 395/674, 614, 395/676, 490, 685, 702, 683, 704, 326, 608, 800, 684, 705, 680, 619, 612

[56] References Cited

U.S. PATENT DOCUMENTS

| | | | |
|---|---|---|---|
| 5,043,923 | 8/1991 | Joy et al. | 395/508 |
| 5,083,263 | 1/1992 | Joy et al. | 395/800 |
| 5,159,680 | 10/1992 | Joy et al. | 395/800 |
| 5,347,632 | 9/1994 | Filepp et al. | 395/200.09 |
| 5,488,721 | 1/1996 | Rich et al. | 395/614 |
| 5,499,365 | 3/1996 | Anderson et al. | 395/619 |
| 5,542,078 | 7/1996 | Martel et al. | 395/612 |
| 5,551,028 | 8/1996 | Voll et al. | 395/614 |

*Primary Examiner*—Thomas G. Black
*Assistant Examiner*—Charles Leon Rones
*Attorney, Agent, or Firm*—Gary S. Williams; Flehr Hohbach Test Albritton & Herbert LLP

[57] ABSTRACT

In summary, the present invention is a multithreaded computer system having a memory that stores a plurality of objects and a plurality of procedures. Each object has a lock status of locked or unlocked, and includes a data pointer to a data structure. The system uses a first object locking procedure to service lock requests on objects that have never been locked as well as object that have not recently been locked, and uses a second object locking procedure to service lock requests on locked objects and object that have been recently locked. The first object locking procedure has instructions for changing a specified unlocked object's lock status to locked, for copying the data structure referenced by the data pointer to an enlarged data structure including a lock data subarray for storing lock data, and for updating the data pointer to point to the enlarged data structure. The second object locking procedure has instructions for updating a specified object's stored lock data. A lock data cleanup procedure, executed when the system's garbage collection procedure is executed, releases the lock data subarray of a specified object if the object has not been recently locked.

18 Claims, 5 Drawing Sheets

SYSTEM AND METHOD FOR SPACE EFFICIENT OBJECT LOCKING USING A DATA SUBARRAY AND POINTERS

The present invention relates generally to object oriented computer systems in which two or more threads of execution can be synchronized with respect to an object, and particularly to a system and method for efficiently allocating lock data structures in a system where most or all objects are lockable, but relative few objects are in fact ever locked.

BACKGROUND OF THE INVENTION

In multiprocessor computer systems, software programs may be executed by threads that are run in parallel on the processors that form the multiprocessor computer system. As a result, a program may be run in parallel on different processors since concurrently running threads may be executing the program simultaneously. Moreover, if a program can be broken down into constituent processes, such computer systems can run the program very quickly since concurrently running threads may execute in parallel the constituent processes. Single processor, multitasking computer systems can also execute multiple threads of execution virtually simultaneously through the use of various resource scheduling mechanisms well known to those skilled in the art of multitasking operating system design.

The programs run on such computer systems are often object-oriented. In other words, the threads executing the programs may invoke objects to perform particular functions. However, the functions of some objects may be implemented only one at a time because of hardware or software constraints in the computer system. For example, an object may require access to a shared computer resource, such as an I/O device, that can only handle one access by one thread at a time. Thus, since concurrently running threads may concurrently seek to invoke such an object, the object must be synchronized with only one thread at a time so that only that thread has exclusive use to the object (i.e., only one thread at a time can own a lock on the object).

In the past, various approaches have been used to synchronize an object with a thread. These include the use of synchronization constructs like mutexes, condition variables, and monitors. When using monitors, each monitor identifies the thread that currently owns the object and any threads that are waiting to own the object. However, in the computer systems that employ these monitors there is a monitor for every synchronizable object. As a result, this approach has the distinct disadvantage of requiring a large amount of memory.

It is an object of the present invention to provide a object locking system in which space is allocated for lock data on an as-needed basis so as to avoid the allocation of memory resources for lock data structures for objects that while lockable, are in fact never locked.

It is another object of the present invention to provide a lock data allocation system and method that is computationally efficient and that imposes a computational overhead that is proportional to the number of locked objects.

SUMMARY OF THE INVENTION

In summary, the present invention is a multithreaded computer system having a memory that stores a plurality of objects and a plurality of procedures. Each object has a lock status of locked or unlocked, and includes a data pointer to a data structure and methods pointer to a methods array. The system uses a first object locking procedure to service lock requests on objects that have not been allocated a lock data subarray (i.e., objects that have never been locked and objects that have not recently been locked), and uses a second object locking procedure to service lock requests on objects that have been allocated a lock data subarray (i.e., objects that are locked and objects that have been recently locked).

The first object locking procedure has instructions for changing a specified unlocked object's lock status to locked, for copying the data structure referenced by the data pointer to an enlarged data structure including a lock data subarray for storing lock data, for updating the data pointer to point to the enlarged data structure, and for changing the methods pointer to point to a methods array that includes the second object locking procedure.

The second object locking procedure has instructions for updating a specified object's stored lock data. A lock data cleanup procedure, executed when the system's garbage collection procedure is executed, releases the lock data subarray of a specified object if the object has not been recently locked.

In a preferred embodiment, each object that has not been allocated a lock data subarray has a methods pointer that references a set of procedures that includes the first object locking procedure; such object are necessarily never in a locked condition. Each object that has been allocated a lock data subarray has a methods pointer that references a set of procedures that includes the second object locking procedure. Furthermore, the first object locking procedure includes instructions for updating a specified object's method pointer to point to a set of procedures that includes the second object locking procedure. The lock data cleanup procedure includes instructions, activated when a specified object's updated lock data indicate that the specified object has not been recently locked, for changing the specified object's method pointer to point to a set of procedures that includes the first object locking procedure.

More specifically, in a preferred embodiment the computer system includes a set of object classes, and each object class includes a primary virtual function table (VFT) that includes pointers referencing a set of methods associated with the object class as well as a pointer that references the first object locking procedure. Each object that has not been recently locked has a methods pointer that references the primary VFT for a corresponding object class.

For each object class for which there is at least one object that has been recently locked, the system stores a secondary virtual function table (VFT) that includes pointers referencing the set of methods associated with its object class as well as a pointer that references the second object locking procedure. The first object locking procedure includes instructions for updating a specified object's method pointer to reference the secondary VFT for the object class corresponding to the specified object, creating this secondary VFT if this results in the first object of this type that is locked.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
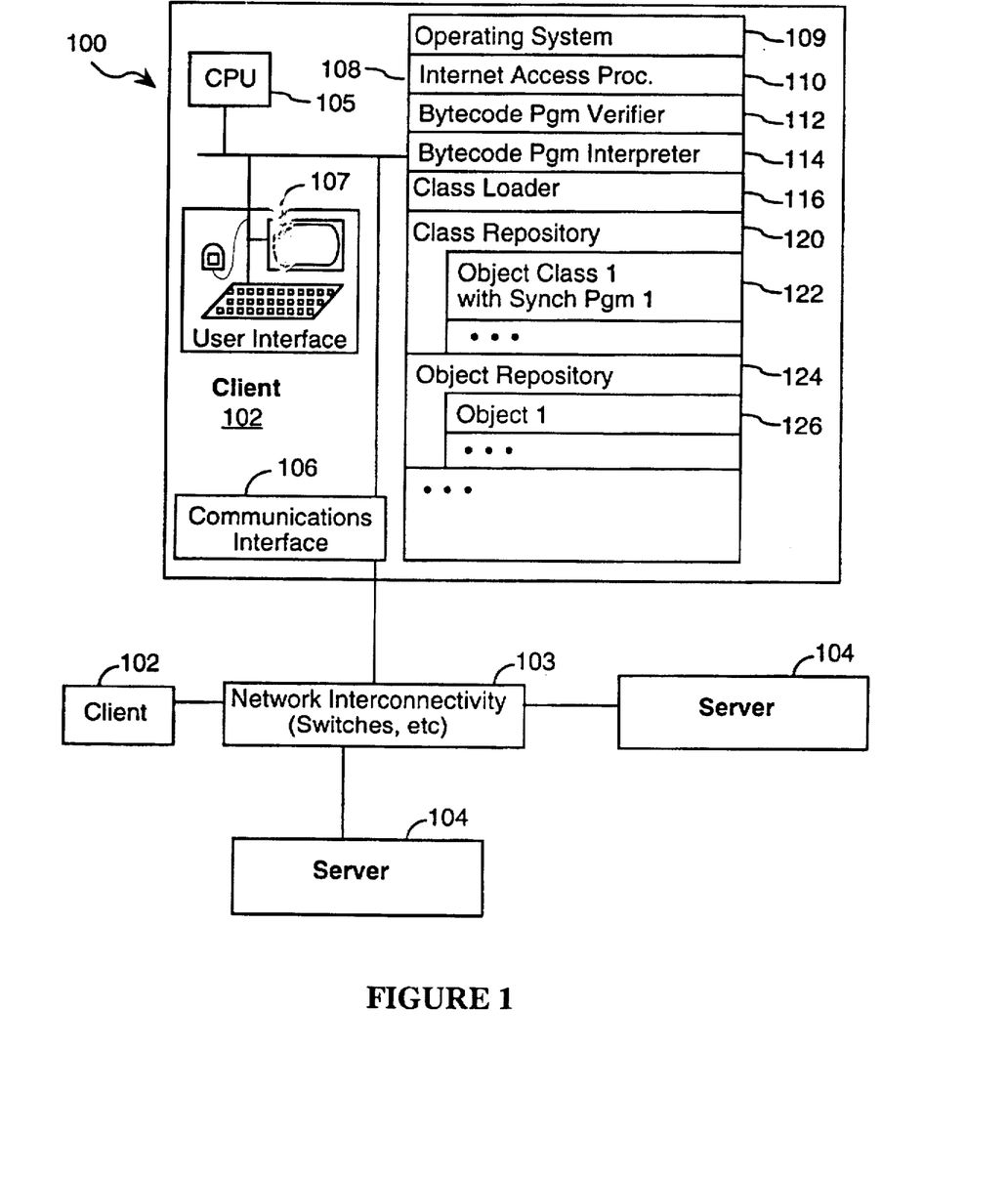
FIG. 1 is a block diagram of a computer system incorporating a preferred embodiment of the present invention.

Referring to FIG. 1, there is shown a distributed computer system 100 having multiple client computers 102 and multiple server computers 104. In the preferred embodiment, each client computer 102 is connected to the servers 104 via the Internet 103, although other types of communication connections could be used. While most client computers are desktop computers, such as SUN workstations, IBM compatible computers and MACINTOSH computers, virtually any type of computer can be a client computer (SUN is a trademark of Sun Microsystems, Inc., IBM is a trademark of IBM Corp., and MACINTOSH is a trademark of Apple Computer, Inc.). In the preferred embodiment, each client computer includes a CPU 105, a communications interface 106, a user interface 107, and memory 108. Memory 108 stores:

- an operating system 109;
- an Internet communications manager program 110;
- a bytecode program verifier 112 for verifying whether or not a specified program satisfies certain predefined integrity criteria;
- a bytecode program interpreter 114 for executing application programs;
- a class loader 116, which loads object classes into a user's address space and utilizes the bytecode program verifier to verify the integrity of the methods associated with each loaded object class;
- at least one class repository 120, for locally storing object classes 122 in use and/or available for use by user's of the computer 102;
- at least one object repository 124 for storing objects 126, which are instances of objects of the object classes stored in the object repository 120.

In the preferred embodiment the operating system 109 is an object oriented multitasking operating system that supports multiple threads of execution within each defined address space. The operating system furthermore uses a garbage collection procedure to recover the memory space associated with released data structures. The garbage collection procedure is automatically executed on a periodic basis, and is also automatically invoked at additional times when the amount of memory available for allocation falls below a threshold level. For the purposes of this document it may be assumed that all objects in the system 109 are lockable objects, although in practice relatively few objects are actually ever locked.

The class loader 116 is typically invoked when a user first initiates execution of a procedure, requiring that an object of the appropriate object class be generated. The class loader 116 loads in the appropriate object class and calls the bytecode program verifier 112 to verify the integrity of all the bytecode programs in the loaded object class. If all the methods are successfully verified an object instance of the object class is generated, and the bytecode interpreter 114 is invoked to execute the user requested procedure, which is typically called a method. If the procedure requested by the user is not a bytecode program and if execution of the non-bytecode program is allowed (which is outside the scope of the present document), the program is executed by a compiled program executer (not shown).

The class loader is also invoked whenever an executing bytecode program encounters a call to an object method for an object class that has not yet been loaded into the user's address space. Once again the class loader 116 loads in the appropriate object class and calls the bytecode program verifier 112 to verify the integrity of all the bytecode programs in the loaded object class. In many situations the object class will be loaded from a remotely located computer, such as one of the servers 104 shown in FIG. 1. If all the methods in the loaded object class are successfully verified, an object instance of the object class is generated, and the bytecode interpreter 114 is invoked to execute the called object method.

Synchronized methods are defined for the purposes of this document to be methods that include use a locking methodology so as to limit the number of threads of execution (hereinafter "threads") that can simultaneously use a system resource. The most common synchronization tool is a mutex, which enables only a single thread to use a particular system resource at any one time, and which includes a mechanism for keeping track of threads of execution waiting to use the resource. While the synchronization mechanism described in this document is a mutex type of locking mechanism, the methodology of the present invention is equally applicable to computers system having other synchronization mechanisms, including semaphores, time based lock expirations, and so on.

In the context of the preferred embodiment, a synchronized method is always synchronized on a specific object. For example, multiple threads may execute synchronized methods that call for exclusive use of a system resource represented by a specific object. When any one of the threads has "possession" of the lock on the object, all other threads that request possession of the lock on the object are forced to wait until all the earlier threads get and then release the lock on the object.

Data Structures for Unlocked and Locked Objects

Figure 2:
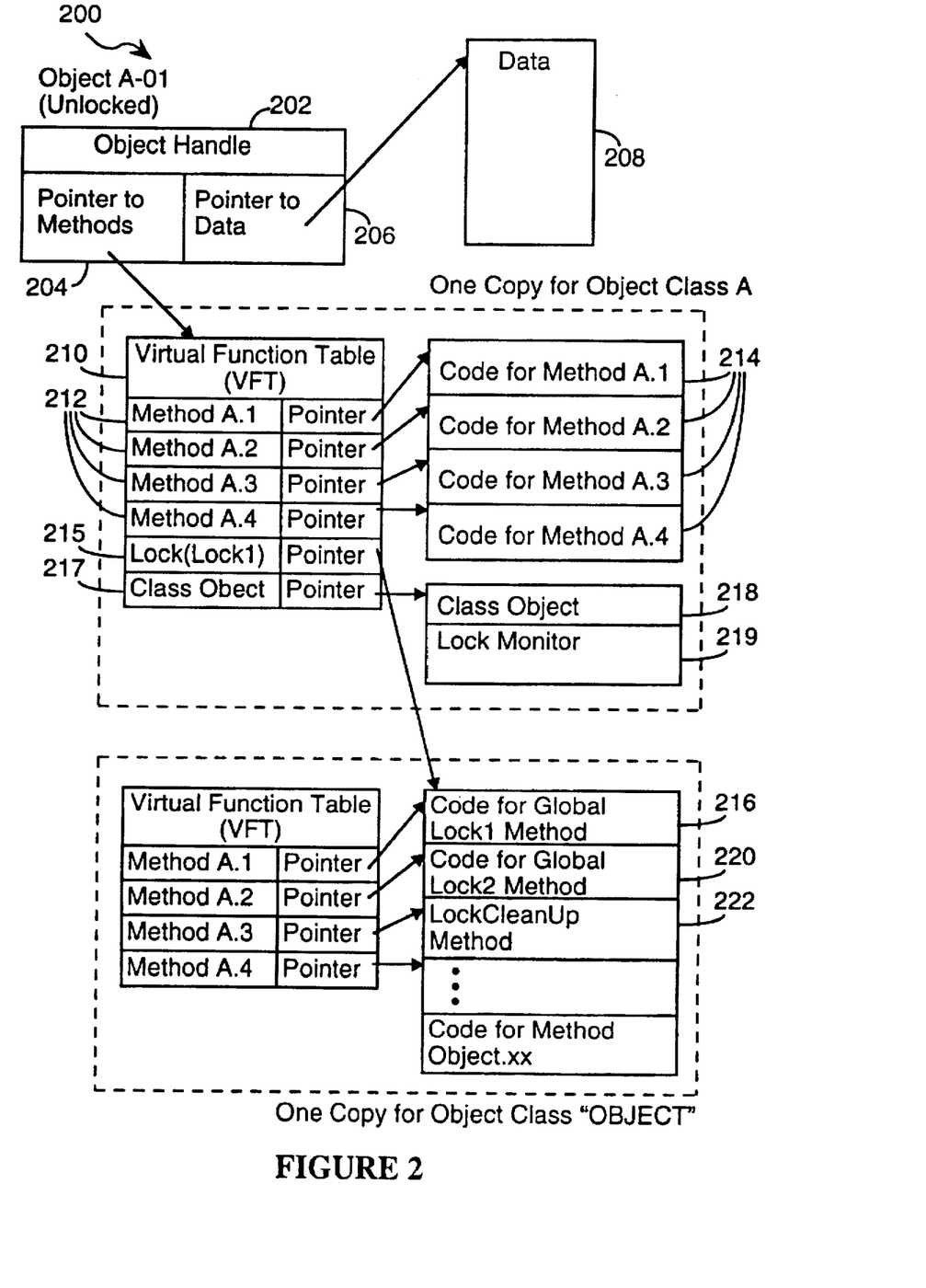
FIG. 2 is a block diagram of the data structure for an object that has not yet been allocated a lock data subarray in a preferred embodiment of the present invention.

FIG. 2 shows the data structure 200 in a preferred embodiment of the present invention for an object that has not been recently locked. As will be described next, all such objects are, necessarily, unlocked, and furthermore have not been allocated a lock data subarray. In one preferred embodiment, the phrase "object X has not been recently locked" is defined to mean that object X has not been locked since the last garbage collection cycle by the operating system. In other preferred embodiments, the term "recently" may be defined as a predefined amount of time, such as a certain number of seconds, or as the period of time since a dependable periodic event in the computer system other than the execution of the garbage collection procedure.

An object of object class A has an object handle 202 that includes a pointer 204 to the methods for the object and a pointer 206 to a data array 208 for the object.

The pointer 204 to the object's methods is actually an indirect pointer to the methods of the associated object class. More particularly, the method pointer 204 points to the Virtual Function Table (VFT) 210 for the object's object class. Each object class has a VFT 210 that includes (A) pointers 212 to each of the methods 214 of the object class, (B) a pointer 215 to a global lock method (Lock1) 216 for synchronizing an object to a thread, and (C) a pointer 217 to a special Class Object 218. There is one Class Object 218 for each defined object class, and the Class Object includes a permanently allocated lock data subarray (sometimes called a lock monitor) 219. The Class Object 218 is used in the preferred embodiment to synchronize access to the lock data subarrays of all objects that are instances of the corresponding object class.

As shown in FIG. 2, there is only one copy of the VFT 210 and the object methods 214 for the entire object class A, regardless of how many objects of object class A may exist. Furthermore, the Lock1 global lock method 216 is a method of the "Object" object class, which is the object class at the top of the object class hierarchy in the preferred embodiment.

The Lock1 method is used to handle requests by threads to synchronize with an object that has not yet been allocated a lock data subarray. FIG. 2 also shows that the "Object" object class also includes a second global lock method 220, called Lock2. The Lock2 method is used to handle requests by threads to synchronize with an object that has already been allocated a lock data subarray. This distinction will be explained in more detail below. The "Object" object class further includes a third lock method 222, called the LockCleanUp method for reclaiming the lock data subarray from an object.

It should be pointed out that the three lock methods 216, 220, 222 could be implemented as the methods of any object class known to be available in all systems using the methodology of the present invention, and do not need to be part of the "Object" object class.

Figure 3:
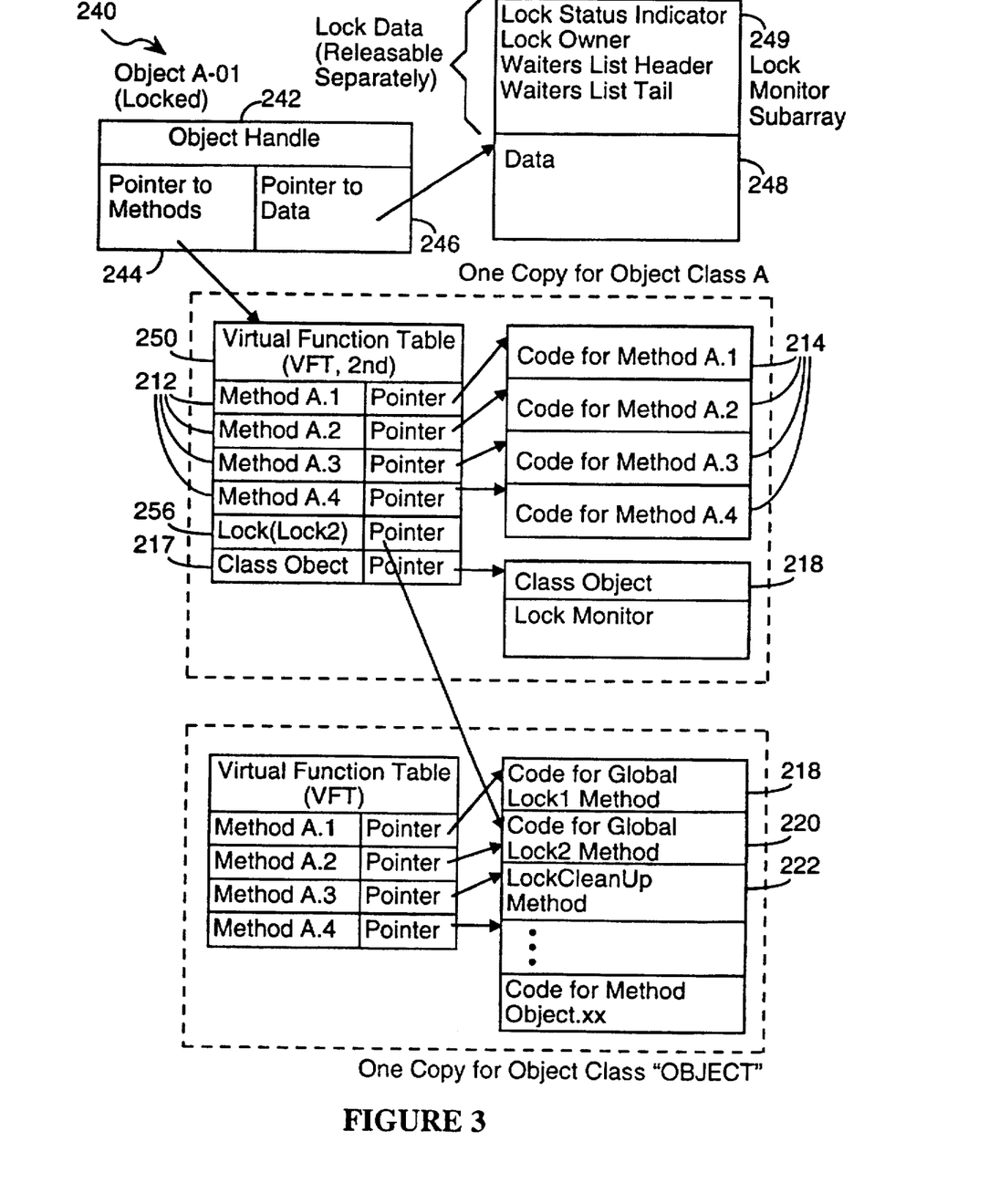
FIG. 3 is a block diagram of the data structure for an object for which a lock data subarray has been allocated in a preferred embodiment of the present invention.

FIG. 3 shows the data structure 240 for a locked object in a preferred embodiment of the present invention. This is also the data structure for any object that has recently been locked, and thus has been allocated a lock data subarray. A locked object of object class A has an object handle 242 that includes a pointer 244 to the methods for the object and a pointer 246 to a data array 248 for the object. As shown, data array 248 includes a lock data subarray 249 for storing lock data. The lock data subarray 249 includes an object lock status indicator, a lock owner value, and a list header and list tail for a list of waiters (i.e., threads waiting to synchronize with the object). In the preferred embodiment, the lock status indicator includes a first flag value (the Lock flag) that indicates whether the object is locked or unlocked, and a second flag value (the NotRecentlyLocked flag) that indicates whether or not the object has been recently locked. The NotRecentlyLocked flag is set (to True) if the object has not been recently locked. In the preferred embodiment, the NotRecentlyLocked flag is set by the LockCleanUp method, and is cleared by the Lock1 and Lock2 methods.

The exact configuration of data in the lock data 249 is not important to the present invention. What is important is that data array 248 is a copy of the data array 208 used when the object was unlocked, plus a separately releasable subarray 249 for holding the lock data. Subarray 249 is "separately releasable" in that this portion of the data array can be released without releasing the rest of the data array 248, and the released subarray 249 is then garbage collected by the operating system of the computer 102 in the normal course of operation.

The method pointer 244 of an object that has recently been locked points to a second version of the Virtual Function Table (VFT,2nd) 250 for the object's object class. Each object class that has at least one object with an allocated lock data subarray has a second VFT (VFT,2nd) 250 that includes (A) pointers 212 to each of the methods 214 of the object class, and (B) a pointer 256 to the second global lock method (Lock2) 220 for synchronizing an object to a thread.

As shown in FIG. 3, there is only one copy of the second VFT 250 and the object methods 214 for the entire object class A, regardless of how many objects of object class A may exist. Furthermore, in the preferred embodiment, the Lock2 global lock method 220 is a method of the "Object" object class, but as stated earlier the location of the Lock2 global lock method is inessential.

The Object Locking Methodology

Each computer system, such as a client computer 102, has many objects, each having an associated object class. Every object is said to be an instance of its associated object class. Each object class inherits properties from its superclass, and every object class is a subclass of a top level object class called the "Object" object class.

For each object class that exists in a particular address space, there is a virtual function table (VFT) that contains a list of all the methods (i.e., executable procedures) associated with the object class as well as a pointer to each of those methods. As shown in FIG. 2, the VFT for each object class also includes a reference to the Lock1 method, which in the preferred embodiment is a method associated with the "Object" object class.

Whenever an object has not been allocated a lock data subarray, its method pointer points to the default VFT for the object's object class.

In accordance with a first preferred embodiment of the present invention, each object class has two associated virtual function tables: the first VFT mentioned above, sometimes herein referred to as "the primary VFT," and a secondary VFT that is used when an object has been allocated a lock data subarray, and which references a second global lock method Lock2 that is different from the first global lock method Lock1 referenced by the primary VFT.

Tables 1, 2 and 3 contain pseudocode representations of the Lock1, Lock2 and LockCleanUp software routines relevant to the present invention. The pseudocode used in these appendices utilizes universal computer language conventions. While the pseudocode employed here has been invented solely for the purposes of this description, it is designed to be easily understandable by any computer programmer skilled in the art.

Figure 4:
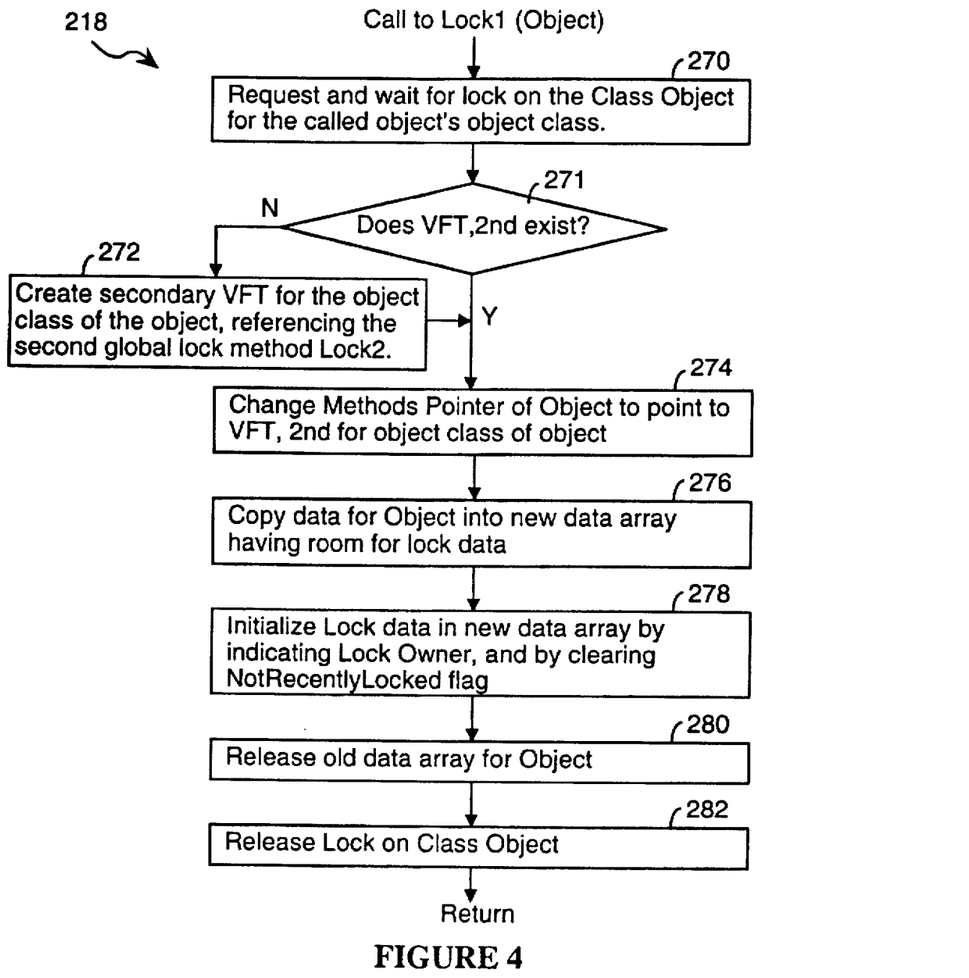
FIGS. 4, 5 and 6 are flow charts of the procedures for locking an object in a preferred embodiment of the present invention.

Referring to FIG. 4 and the pseudocode for the Lock1 method 216 shown in Table 1, when an object that has not been allocated a lock data subarray is the subject of a synchronized method call, the global lock method (Lock1) associated with the object is invoked. The Lock1 method begins by requesting and waiting for a lock on the Class Object associated with the object to be locked (step 270). The remainder of the Lock1 method is not executed until the thread making the Lock1 method call obtains a lock on the Class Object.

The Lock1 and LockCleanUp methods need to be synchronized, by acquiring a lock on the Class Object, to prevent against corruption due to concurrency. For example, in a multiprocessor system, the Lock1 procedure could be simultaneously invoked by two processors on the same object at the same time. Unless precautions are taken, this could result in two new objects being created, and might result in two threads executing while both thought they had the same lock. To solve this problem it is necessary in the Lock1 and LockCleanUp procedures to lock the Class Object for the type of a specified object while rearranging the specified object's internal data structure.

After obtaining a lock on the Class Object, if a secondary VFT for the object class of the object does not already exist (step 271), the Lock1 method creates a secondary VFT for the object class that references the second global lock method Lock2 (step 272), and changes the methods pointer of the object to point to the secondary VFT of the object class for the object (step 274). if the secondary VFT for the object class already exists (step 270), the Lock1 procedure just changes the methods pointer of the object to point to the secondary VFT of the object class for the object (step 274).

Next, the Lock1 method copies the data portion of the object into a new data array that includes a subarray having room for lock data (step 276). The Lock1 method then initializes the lock data subarray by storing data representing the identity of the lock owner thread in the lock data subarray and by clearing the NotRecentlyLocked flag (step 278). It also releases the old data array for the object (step 280) and releases the lock on the Class Object (step 282) before returning control to the synchronized method that invoked the Lock1 procedure.

Thus, after the Lock1 method is called on an unlocked object, the object has an allocated lock data subarray, is locked and the virtual function table for the object points to a different global lock method, Lock2, for handling subsequent synchronization requests.

Figure 5:
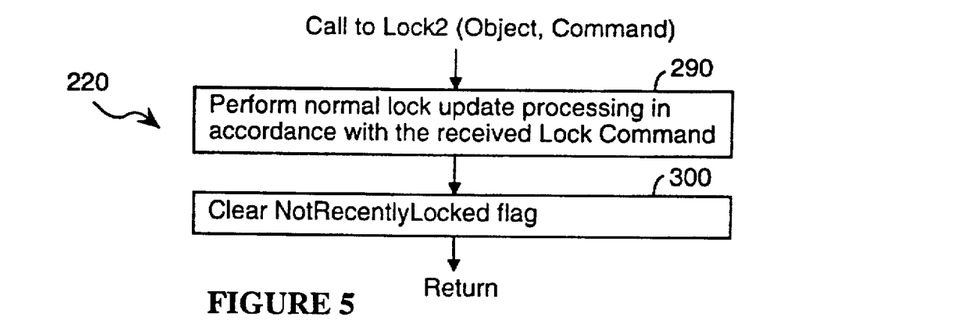

Referring to FIG. 5 and the pseudocode for the Lock2 method 220 shown in Table 2, the Lock2 method simply performs normal servicing of the received synchronization request, which includes normal updating of the lock data (step 290). In addition, any call to the Lock2 method causes the specified object's NotRecentlyLocked flag to the cleared (step 300). In an alternate embodiment the specified object's NotRecentlyLocked flag is cleared only if the object has a lock status of Locked after the synchronization request has been processed. The Lock2 method is so simple because it is known that whenever the Lock2 method is called, the specified object (i.e., the subject of the lock processing) already has a lock data subarray.

For normal mutex operation, if the lock handling request (i.e., the request being handled by the Lock2 method) is by a thread to synchronize with the associated object, the thread is added to the waiting thread list for the object. If the request is to release the lock held by a thread, the waiting thread if any highest on the waiting threads list is made the lock owner and is allowed to resume execution. If the request is to release the lock held by a thread, and there are no waiting threads, then the lock status is updated to "unlocked", which in some implementations may be indicated simply by the Lock Owner datum being changed to a null value and the Lock status flag being reset to False.

The Lock2 method continues to be used to handle all synchronization requests on the object, even after the object becomes unlocked, until the object's lock data subarray is deallocated by the LockCleanUp method.

Figure 6:
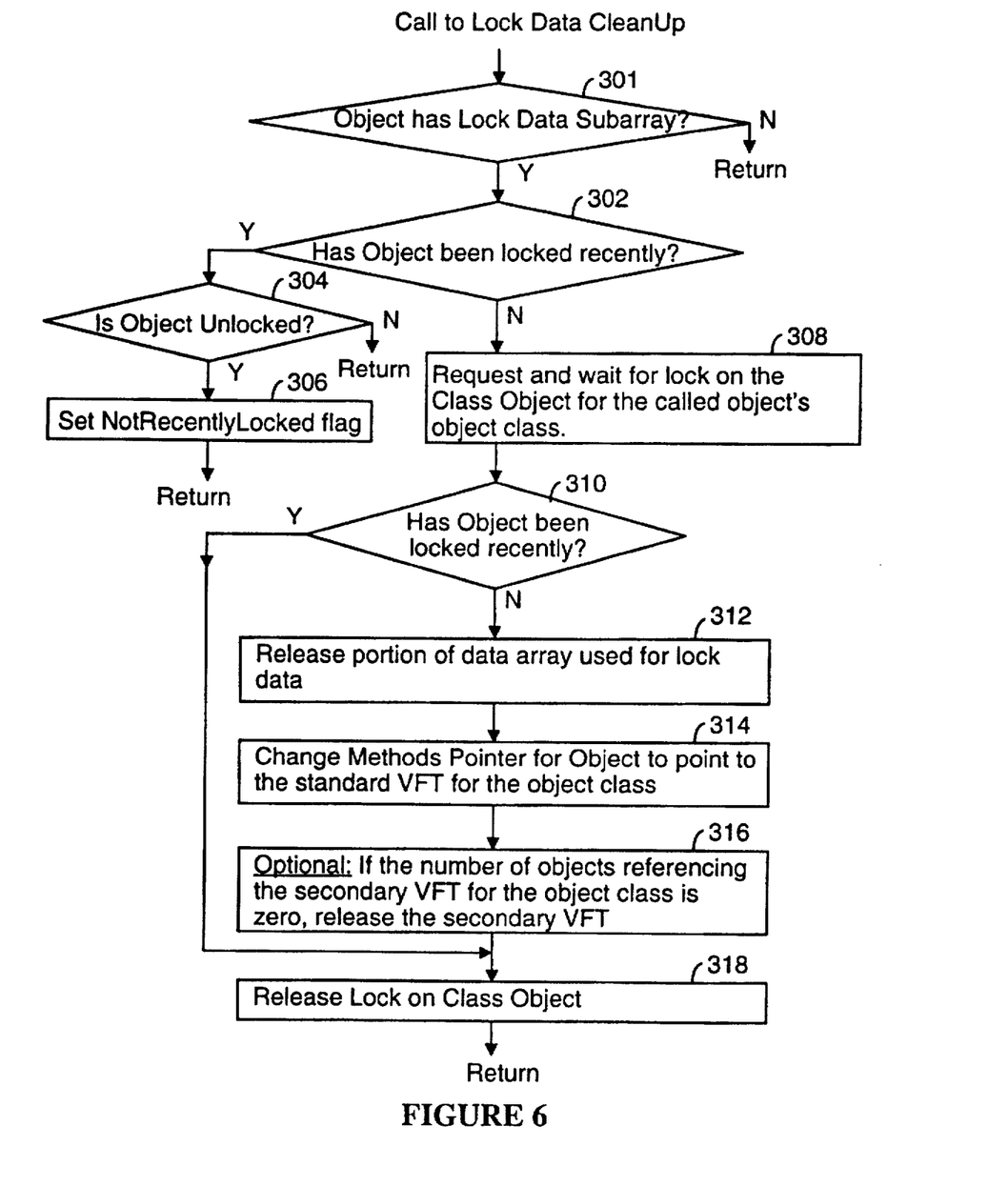

Referring to FIG. 6 and the pseudocode for the LockCleanUp method 222 shown in Table 3, in a preferred embodiment the LockCleanUp method is called by the garbage collection procedure to check all objects with allocated lock data subarrays each time execution of the garbage collection procedure is initiated, Alternately, the LockCleanUp method is called by the garbage collection procedure to check all objects each time execution of the garbage collection procedure is initiated.

In the preferred embodiment of the present invention, if any object's lock data subarray remains unused for the period of time between two garbage collection cycles, that object is considered to not have been recently locked. More specifically, if an object's NotRecentlyLocked flag is set to True by the LockCleanUp procedure during one garbage collection cycle, and remains true at the next garbage collection cycle, then the lock data subarray for that object is released.

The LockCleanUp procedure begins by determining if the object specified by the calling procedure (e.g., the garbage collection procedure) has a lock data subarray (301), and simply exits if the specified object does not have a lock data subarray. Next, the procedure determines whether the specified object has been recently locked (302). In the preferred embodiment, an object is considered not to have been recently locked if the NotRecentlyLocked flag in its lock data subarray is set to True. An object is considered to have been recently locked if it has a lock data subarray and the NotRecentlyLocked flag is set to False (i.e., the flag is not set).

If the object has been recently locked (302-Y), but the object is currently unlocked (304), the LockCleanUp procedure sets the NotRecentlyLocked flag for the object to True (306), and then exits. Step 306 prepares the object's lock data subarray for release during the next garbage collection cycle if the lock data subarray remains unused during that time.

If the object's NotRecentlyLocked flag indicates that it has not been recently locked (302-N), the LockCleanUp procedure requests and waits for a lock on the Class Object associated with the object to be locked (step 308). The remainder of the LockCleanUp method is not executed until the thread making the LockCleanUp method call obtains a lock on the Class Object.

Next, once the lock on the Class Object has been obtained, the LockCleanUp procedure once again checks to see if the specified object has been recently locked (step 310). Note that it is possible that another thread locked the specified object while the calling thread was waiting for a lock on the Class Object. In that case, it would be improper to deallocate the specified object's lock data subarray, and that is why a second check (310) on the NotRecentlyLocked flag of the specified object is necessary. If the object has been recently locked (310-Y), the LockCleanUp procedure releases the lock on the Class Object (step 318) and then exits. Otherwise (310-N), the lock data subarray portion of the specified object's data array is deallocated and released for garbage collection (step 312). In addition the methods pointer for the object is changed to point to the primary VFT for the object class (step 14).

In some systems, secondary VFTs are released when no objects reference them (316). This is handled by keeping a counter value in each secondary VFT to keep track of the number of referencing objects. In such implementations, if step 314 causes the number of objects referencing the secondary VFT to drop to zero, then the secondary VFT is released for garbage collection. In other implementations, secondary VFTs are not released, because there can be at most one secondary VFT for each object class and therefore the memory overhead associated with secondary VFTs will typically be very small.

Finally, the lock on the Class Object is released (step 318) just prior to the LockCleanUp procedure exiting and returning control to its calling thread.

Using the above described methodology, objects that are unlocked incur no memory overhead to support object locking. Only objects that are locked have memory space allocated to store lock data.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

For instance, other mechanisms than the NotRecentlyLocked flag could be used to determine whether an object has been recently locked. For example, a timestamp could be stored in the lock data subarray of unlocked objects at the time they are unlocked, and that timestamp could be checked by the LockCleanUp procedure. If the timestamp represents a time more than a threshold amount of time in the past, the object would be determined to not have been recently locked.

While the lock data subarray described above is suitable for implementing a mutex, the same lock data subarray allocation and release methodology and mechanism could be used to allocate and release more complex lock data structures, such as those for semaphores and those for monitors that handle waits on notification events.

TABLE 1

PSEUDOCODE REPRESENTATION OF LOCK1 METHOD

```
Procedure: Lock1 (Object, Command)
/* Object arg is the object to be locked */
{
/*  Acquire lock to ensure that multiple threads do not try to process the
    object at the same item    */
Request and Wait for Lock on ClassObject of Class(Object)
/* Steps for handling Methods    */
If a Second Virtual Function Table does not yet exist
    {   Create a Second Virtual Function Table (VFT,2nd) for the
        Object Class of the Object
    }
Change Methods Pointer of Object to point to VFT,2nd for Object Class
of
    the Object
/* Steps for Handling Data    */
Copy data for Object into a new data array having room for lock data
Initialize Lock Data in new data array by indicating the Lock Owner and
    by clearing the NotRecentlyLocked Flag (i.e., the Object's lock status
    is Lock=True, NotRecentlyLocked=False)
Release old data array for Object
/*
Release lock on ClassObject
Return
}
```

TABLE 2

PSEUDOCODE REPRESENTATION OF LOCK2 METHOD

```
Procedure: Lock2 (Object, Lock Command)
{
/*  Object already has a lock data subarray    */
Perform normal lock update processing in accordance with the received
    Lock Command
If status of object is changed from unlocked to locked
    {   Clear Object's NotRecentlyLocked Flag    }
Return
```

TABLE 3

PSEUDOCODE REPRESENTATION OF LOCK DATA CLEANUP METHOD

```
Procedure: LockCleanUp (Object)
{
If Object does not have a lock data subarray
    {   Return    }
```

TABLE 3-continued

PSEUDOCODE REPRESENTATION OF LOCK DATA CLEANUP METHOD

```
/*  Set up Object's lock data subarray for release on the next garbage
    collection cycle if the object is unlocked but its NotRecentlyLocked
    flag is set to False    */
If Object's NotRecentlyLocked Flag is set to False (i.e., it has been
    cleared by the Lock1 or Lock2 method since the prior garbage
    collection cycle)
    {
    If Object is Unlocked
        {
        Set NotRecentlyLocked flag to True
        }
    Return
    }
/*  The Object has not been recently Locked!    */
/*  Acquire lock to ensure that multiple threads do not try to process the
    object at the same item    */
Request and Wait for Lock on ClassObject of Class(Object)
/*  Recheck the NotRecentlyLocked flag    */
If Object has not been recently locked (e.g., not since prior garbage
    collection cycle)
    {
    Release portion of data array used for Lock Data (In some
        implementations the Release step may involve updating the
        Data Pointer for the Object)
    Change Methods Pointer for Object to point to the primary VFT for
        the Object Class
    Optional Step:

If the number of objects referencing VFT,2nd for the Object Class is
        zero
        { Release VFT,2nd }
    }
Release lock on ClassObject
Return
}
```

What is claimed is:

1. A computer system, comprising:
   memory for storing a plurality of objects and a plurality of procedures, each stored object having a lock status selected from the set consisting of locked and unlocked, each stored object including a data pointer to a data structure;
   a first object locking procedure, including instructions for changing a specified unlocked object's lock status to locked, for copying said data structure pointed to by said data pointer to an enlarged data structure including a lock data subarray for storing lock data and for updating said data pointer to point to said enlarged data structure;
   a second object locking procedure including instructions for updating a specified object's stored lock data; and
   a lock data cleanup procedure for releasing a specified object's lock data subarray when predefined release criteria are satisfied;
   wherein said system uses said first object locking procedure to service lock requests on objects that do not have a lock data subarray, uses said second object locking procedure to service lock requests on objects that do have a lock data subarray, and uses said lock data cleanup procedure to release a specified object's lock data subarray;
   each stored object that has not recently had a lock status of locked including a methods pointer to a first subset of said procedures that includes said first object locking procedure and does not include said second object locking procedure;
   each stored object that has recently had a lock status of locked including a methods pointer to a second subset of said procedures that includes said second object locking procedure and does not include said first object locking procedure;

said first object locking procedure including instructions for updating said specified object's method pointer to point to said second subset of said procedures that includes said second object locking procedure.

2. A computer system, comprising:

memory for storing a plurality of objects and a plurality of procedures, each stored object having a lock status selected from the set consisting of locked and unlocked, each stored object including a data pointer to a data structure;

a first object locking procedure, including instructions for changing a specified unlocked object's lock status to locked, for copying said data structure pointed to by said data pointer to an enlarged data structure including a lock data subarray for storing lock data and for updating said data pointer to point to said enlarged data structure;

a second object locking procedure including instructions for updating a specified object's stored lock data; and a lock data cleanup procedure for releasing a specified object's lock data subarray when predefined release criteria are satisfied;

wherein said system uses said first object locking procedure to service lock requests on objects that do not have a lock data subarray, uses said second object locking procedure to service lock requests on objects that do have a lock data subarray, and uses said lock data cleanup procedure to release a specified object's lock data subarray;

each stored object which has never had a lock status of locked including a methods pointer to a first subset of said procedures that includes said first object locking procedure and does not include said second object locking procedure;

each stored object having a lock status of locked including a methods pointer to a second subset of said procedures that includes said second object locking procedure and does not include said first object locking procedure;

said first object locking procedure including instructions for updating said specified object's method pointer to point to said second subset of said procedures that includes said second object locking procedure.

3. The computer system of claim 2, said lock data cleanup procedure including instructions for changing said specified object's method pointer to point to said subset of said procedures that includes said first object locking procedure.

4. A computer system, comprising:

memory for storing a plurality of objects and a plurality of procedures, each stored object having a lock status selected from the set consisting of locked and unlocked, each stored object including a data pointer to a data structure;

a first object locking procedure, including instructions for changing a specified unlocked object's lock status to locked, for copying said data structure pointed to by said data pointer to an enlarged data structure including a lock data subarray for storing lock data and for updating said data pointer to point to said enlarged data structure;

a second object locking procedure including instructions for updating a specified object's stored lock data; and a lock data cleanup procedure for releasing a specified object's lock data subarray when predefined release criteria are satisfied;

wherein said system uses said first object locking procedure to service lock requests on objects that do not have a lock data subarray, uses said second object locking procedure to service lock requests on objects that do have a lock data subarray, and uses said lock data cleanup procedure to release a specified object's lock data subarray;

said memory further storing a set of object classes, each object class including a primary virtual function table (VFT) that includes pointers referencing a set of methods associated with said object class as well as a pointer that references said first object locking procedure;

each of said stored objects that has not recently had a lock status of locked including a methods pointer that references said primary VFT for a corresponding one of said object classes;

for each object class for which there is at least one locked object, a secondary virtual function table (VFT) that includes pointers referencing said set of methods associated with said object class as well as a pointer that references said second object locking procedure;

said first object locking procedure including instructions for updating said specified object's method pointer to reference said secondary VFT for the object class corresponding to said specified object.

5. The computer system, comprising:

memory for storing a plurality of objects and a plurality of procedures, each stored object having a lock status selected from the set consisting of locked and unlocked, each stored object including a data pointer to a data structure;

a first object locking procedure, including instructions for changing a specified unlocked object's lock status to locked, for copying said data structure pointed to by said data pointer to an enlarged data structure including a lock data subarray for storing lock data and for updating said data pointer to point to said enlarged data structure;

a second object locking procedure including instructions for updating a specified object's stored lock data; and a lock data cleanup procedure for releasing a specified object's lock data subarray when predefined release criteria are satisfied;

wherein said system uses said first object locking procedure to service lock requests on objects that do not have a lock data subarray, uses said second object locking procedure to service lock requests on objects that do have a lock data subarray, and uses said lock data cleanup procedure to release a specified object's lock data subarray;

said memory further storing a set of object classes, each object class including a primary virtual function table (VFT) that includes pointers referencing a set of methods associated with said object class as well as a pointer that references said first object locking procedure;

each of said stored objects that has never had a lock status of locked including a methods pointer that references said primary VFT for a corresponding one of said object classes;

for each object class for which there is at least one locked object, a secondary virtual function table (VFT) that includes pointers referencing said set of methods associated with said object class as well as a pointer that references said second object locking procedure;

said first object locking procedure including instructions for updating said specified object's method pointer to reference said secondary VFT for the object class corresponding to said specified object.

6. The computer system of claim 5, said lock data cleanup procedure including instructions for changing said specified object's method pointer to reference said primary VFT for the object class corresponding to said specified object.

7. A method of operating a computer system, comprising the steps of:

storing in a computer memory a plurality of objects and a plurality of procedures, each stored object having a lock status selected from the set consisting of locked and unlocked, each stored object including a data pointer to a data structure;

when servicing a lock request on a specified object that has never been locked, executing a first object locking procedure that includes instructions for changing the specified object's lock status to locked, for copying said data structure pointed to by said data pointer to an enlarged data structure including a lock data subarray for storing lock data and for updating said data pointer to point to said enlarged data structure;

when servicing a lock request on a specified locked object that has an allocated lock data subarray, executing a second object locking procedure that includes instructions for updating said specified object's stored lock data;

associating with each stored object that has not recently had a lock status of locked a methods pointer to a first subset of said procedures that includes said first object locking procedure and does not include said second object locking procedure;

associating with each stored object that has recently had a lock status of locked including a methods pointer to a second subset of said procedures that includes said second object locking procedure and does not include said first object locking procedure;

when executing said first object locking procedure to service a lock request on an unlocked object, updating said specified object's method pointer to point to said second subset of said procedures that includes said second object locking procedure; and when predefined release criteria are satisfied, executing a lock data cleanup procedure to release a specified object's lock data subarray.

8. A method of operating a computer system, comprising the steps of:

storing in a computer memory a plurality of objects and a plurality of procedures, each stored object having a lock status selected from the set consisting of locked and unlocked, each stored object including a data pointer to a data structure;

when servicing a lock request of a specified object that has never been locked, executing a first object locking procedure that includes instructions for changing the specified object's lock status to locked, for copying said data structure pointed to by said data pointer to an enlarged data structure including a lock data subarray for storing lock data and for updating said data pointer to point to said enlarged data structure;

when servicing a lock request on a specified locked object that has an allocated lock data subarray, executing a second object locking procedure that includes instructions for updating said specified object's stored lock data;

associating with each stored object that has never had a lock status of locked a methods pointer to a first subset of said procedures that includes said first object locking procedure and does not include said second object locking procedure;

associating with each stored object having a lock status of locked including a methods pointer to a second subset of said procedures that includes said second object locking procedure and does not include said first object locking procedure;

when executing said first object locking procedure to service a lock request on an unlocked object, updating said specified object's method pointer to point to said second subset of said procedures that includes said second object locking procedure.

9. The method of claim 8, when executing said lock data cleanup procedure, changing said specified object's method pointer to point to said subset of said procedures that includes said first object locking procedure.

10. A method of operating a computer system, comprising the steps of:

storing in a computer memory a plurality of objects and a plurality of procedures, each stored object having a lock status selected from the set consisting of locked and unlocked, each stored object including a data pointer to a data structure;

when servicing a lock request on a specified object teat has never been locked, executing a first object locking procedure that includes instructions for changing the specified object's lock status to locked, for copying said data structure pointed to by said data pointer to an enlarged data structure including a lock data subarray for storing lock data and for updating said data pointer to point to said enlarged data structure;

when servicing a lock request on a specified locked object that has an allocated lock data subarray, executing a second object locking procedure that includes instructions for updating said specified object's stored lock data;

storing in said computer memory a set of object classes, each object class including a primary virtual function table (VFT) that includes pointers referencing a set of methods associated with said object class as well as a pointer that references said first object locking procedure;

associating with each of said stored objects that has not recently had a lock status of locked a methods pointer that references said primary VFT for a corresponding one of said object classes;

for each object class for which there is at least one locked object, storing in said computer memory a secondary virtual function table (VFT) that includes pointers referencing said set of methods associated with said object class as well as a pointer that references said second object locking procedure;

when executing said first object locking procedure, updating said specified object's method pointer to reference said secondary VFT for the object class corresponding to said specified object; and when predefined release criteria are satisfied, executing a lock data cleanup procedure to release a specified object's lock data subarray.

11. A method of operating a computer system, comprising the steps of:

storing in a computer memory a plurality of objects and a plurality of procedures, each stored object having a lock status selected from the set consisting of locked and unlocked, each stored object including a data pointer to a data structure;

when servicing a lock request on a specified object that has never been locked, executing a first object locking procedure that includes instructions for changing the specified object's lock status to locked, for copying said data structure pointed to by said data pointer to an enlarged data structure including a lock data subarray for storing lock data and for updating said data pointer to point to said enlarged data structure;

when servicing a lock request on a specified locked object that has an allocated lock data subarray, executing a second object locking procedure that includes instructions for updating said specified object's stored lock data;

storing in said computer memory a set of object classes, each object class including a primary virtual function table (VFT) that includes pointers referencing a set of methods associated with said object class as well as a pointer that references said first object locking procedure;

associating with each of said stored objects that has never had a lock status of locked a methods pointer that references said primary VFT for a corresponding one of said object classes;

for each object class for which there is at least one locked object, storing in said computer memory a secondary virtual function table (VFT) that includes pointers referencing said set of methods associated with said object class as well as a pointer that references said second object locking procedure;

when executing said first object locking procedure, updating said specified object's method pointer to reference said secondary VFT for the object class corresponding to said specified object; and when predefined release criteria are satisfied, executing a lock data cleanup procedure to release a specified object's lock data subarray.

12. The method of claim 11, when executing said lock data cleanup procedure, changing said specified object's method pointer to reference said primary VFT for the object class corresponding to said specified object.

13. A memory for storing data for access by programs being executed on a data processing system, said memory comprising:

a plurality of objects and a plurality of procedures stored in said memory, each stored object having a lock status selected from the set consisting of locked and unlocked, each stored object including a data pointer to a data structure stored in said memory;

a first object locking procedure, including instructions for changing a specified unlocked object's lock status to locked, for copying said data structure pointed to by said data pointer to an enlarged data structure including a lock data subarray for storing lock data and for updating said data pointer to point to said enlarged data structure;

a second object locking procedure including instructions for updating a specified object's stored lock data; and a lock data cleanup procedure for releasing a specified object's lock data subarray when predefined release criteria are satisfied;

wherein said system uses said first object locking procedure to service lock requests on objects that do not have a lock data subarray, uses said second object locking procedure to service lock requests on objects that do have a lock data subarray, and uses said lock data cleanup procedure to release a specified object's lock data subarray;

each stored object that has not recently had a lock status of locked including a methods pointer to a first subset of said procedures that includes said first object locking procedure and does not include said second object locking procedure;

each stored object that has recently had a lock status of locked including a methods pointer to a second subset of said procedures that includes said second object locking procedure and does not include said first object locking procedure;

said first object locking procedure including instructions for updating said specified object's method pointer to point to said second subset of said procedures that includes said second object locking procedure.

14. A memory for storing data for access by programs being executed on a data processing system, said memory comprising:

a plurality of objects and a plurality of procedures stored in said memory, each stored object having a lock status selected from the set consisting of locked and unlocked, each stored object including a data pointer to a data structure stored in said memory;

a first object locking procedure, including instructions for changing a specified unlocked object's lock status to locked, for copying said data structure pointed to by said data pointer to an enlarged data structure including a lock data subarray for storing lock data and for updating said data pointer to point to said enlarged data structure;

a second object locking procedure including instructions for updating a specified object's stored lock data; and a lock data cleanup procedure for releasing a specified object's lock data subarray when predefined release criteria are satisfied;

wherein said system uses said first object locking procedure to service lock requests on objects that do not have a lock data subarray, uses said second object locking procedure to service lock requests on objects that do have a lock data subarray, and uses said lock data cleanup procedure to release a specified object's lock data subarray;

each stored object which has never had a lock status of locked including a methods pointer to a first subset of said procedures that includes said first object locking procedure and does not include said second object locking procedure;

each stored object having a lock status of locked including a methods pointer to a second subset of said procedures that includes said second object locking procedure and does not include said first object locking procedure;

said first object locking procedure including instructions for updating said specified object's method pointer to point to said second subset of said procedures that includes said second object locking procedure.

15. The memory of claim 14, said lock data cleanup procedure including instructions for changing said specified object's method pointer to point to said subset of said procedures that includes said first object locking procedure.

16. A memory for storing data for access by programs being executed on a data processing system, said memory comprising:

a plurality of objects and a plurality of procedures stored in said memory, each stored object having a lock status selected from the set consisting of locked and unlocked, each stored object including a data pointer to a data structure stored in said memory;

a first object locking procedure, including instructions for changing a specified unlocked object's lock status to locked, for copying said data structure pointed to by said data pointer to an enlarged data structure including a lock data subarray for storing lock data and for updating said data pointer to point to said enlarged data structure;

a second object locking procedure including instructions for updating a specified object's stored lock data; and a lock data cleanup procedure for releasing a specified object's lock data subarray when predefined release criteria are satisfied;

wherein said system uses said first object locking procedure to service lock requests on objects that do not have a lock data subarray, uses said second object locking procedure to service lock requests on objects that do have a lock data subarray, and uses said lock data cleanup procedure to release a specified object's lock data subarray;

said memory further storing a set of object classes, each object class including a primary virtual function table (VFT) that includes pointers referencing a set of methods associated with said object class as well as a pointer that references said first object locking procedure;

each of said stored objects that has not recently had a lock status of locked including a methods pointer that references said primary VFT for a corresponding one of said object classes;

for each object class for which there is at least one locked object, a secondary virtual function table (VFT) that includes pointers referencing said set of methods associated with said object class as well as a pointer that references said second object locking procedure;

said first object locking procedure including instructions for updating said specified object's method pointer to reference said secondary VFT for the object class corresponding to said specified object.

17. A memory for storing data for access by programs being executed on a data processing system, said memory comprising:

a plurality of objects and a plurality of procedures stored in said memory, each stored object having a lock status selected from the set consisting of locked and unlocked, each stored object including a data pointer to a data structure stored in said memory;

a first object locking procedure, including instructions for changing a specified unlocked object's lock status to locked, for copying said data structure pointed to by said data pointer to an enlarged data structure including a lock data subarray for storing lock data and for updating said data pointer to point to said enlarged data structure;

a second object locking procedure including instructions for updating a specified object's stored lock data; and a lock data cleanup procedure for releasing a specified object's lock data subarray when predefined release criteria are satisfied;

wherein said system uses said first object locking procedure to service lock requests on objects that do not have a lock data subarray, uses said second object locking procedure to service lock requests on objects that do have a lock data subarray, and uses said lock data cleanup procedure to release a specified object's lock data subarray;

said memory further storing a set of object classes, each object class including a primary virtual function table (VFT) that includes pointers referencing a set of methods associated with said object class as well as a pointer that references said first object locking procedure;

each of said stored objects that has never had a lock status of locked including a methods pointer that references said primary VFT for a corresponding one of said object classes;

for each object class for which there is at least one locked object, a secondary virtual function table (VFT) that includes pointers referencing said set of methods associated with said object class as well as a pointer that references said second object locking procedure;

said first object locking procedure including instructions for updating said specified object's method pointer to reference said secondary VFT for the object class corresponding to said specified object.

18. The memory of claim 17, said lock data cleanup procedure including instructions for changing said specified object's method pointer to reference said primary VFT for the object class corresponding to said specified object.

* * * * *